Aug. 8, 1967 W. C. MANN ETAL 3,335,403

ERROR CANCELING DECISION CIRCUIT

Filed Oct. 10, 1963

WITNESSES

Leon J. Taza

James T. Young

INVENTORS
William C. Mann and
Paul A. Jensen
BY
Dean Schron
ATTORNEY

United States Patent Office 3,335,403
Patented Aug. 8, 1967

3,335,403
ERROR CANCELING DECISION CIRCUIT

William C. Mann, Laurel, and Paul A. Jensen, Arnold, Md., assignors to Westinghouse Electric Corporation, Pittsburgh, Pa., a corporation of Pennsylvania Filed Oct. 10, 1963, Ser. No. 315,301
6 Claims. (Cl. 340—146.1)

This invention in general relates to redundant logic systems, and more in particular to an improvement over an error canceling decision circuit more fully described and claimed in Patent 3,134,032—May 19, 1964 by William C. Mann and assigned to the same assignee as the present invention.

Redundant systems are used in many types of electrical circuits and are particularly adapted for use in electronic computers. Generally if a failure of a particular circuit occurs in such an electronic computer, an erroneous output or control results necessitating a replacement of the faulty circuit which may be a time consuming, and sometimes impossible operation. The decision circuit of the aforementioned application is operable to eliminate erroneous readings in redundant type systems. This is accomplished by the provision of a plurality of input lines for receiving input signals from a previous redundant stage, which when operating correctly, provides identical and correct signals to the input lines. Each of the input lines includes a current responsive means operable to remove an associated line from the circuit in response to a current exceeding a predetermined magnitude. Each of the lines is connected to a single high impedance threshold device and substantially no current flows in the input lines when the input signals are identical. If an input signal should fail and become incorrect, a flow of current will occur in that line, exceeding the predetermined magnitude and after a predetermined time duration will activate the current responsive means to remove the line receiving the incorrect input signal. The threshold device then provides an output signal in accordance with the correct input signals received, and will continue to do so even after a predetermined number of lines have been removed from the circuit. The predetermined number may be governed by the ratings of the current responsive devices. The ratings may be chosen such that when only three input lines remain operating, no additional lines will be removed upon the occurrence of an incorrect signal and the circuit will operate as a two out of three majority voter. Alternatively, the ratings may be chosen such that a correct output will be provided when only two lines remain in the circuit. With two remaining unremoved lines receiving correct signals, the threshold device will continuously provide a correct output signal. If, however, one of the remaining two correct signals becomes incorrect each of the two lines will experience an equal flow of current and there is a certain chance that the current responsive means in the erring line may be activated, to remove the line receiving the incorrect signal from the circuit.

It is therefore the primary object of the present invention to provide a decision circuit which will eliminate erroneous signals and increase the chances of correct operation when all but one input signal remains.

It is a further object to provide a decision circuit which will eliminate the effect of erroneous input signals received.

It is another object to provide a decision circuit which will provide a correct output signal based on the probability of failure of a previous circuit.

In most systems of logical circuitry utilizing binary ONE and ZERO signals, the probability of an incorrect ONE and the probability of an incorrect ZERO occurring as a result of a failure are not equal. One kind of wrong information will usually predominate and if a circuit is presented with two input signals where one must be right and one must be wrong, it can accurately be determined which signal is more likely to be the correct one. This determination is based on the operation and nature of the circuitry providing these signals. The present invention includes a plurality of input lines for receiving correct redundant signals. Each of the input lines contains therein a current responsive means for removing that line from the circuit in response to a predetermined flow of current caused by an incorrect input signal. Each of the lines is connected to a summation point which may be utilized as the input to a threshold means for providing the correct output signal in accordance with the correct input signals. The present invention utilizes the fact that when two remaining unremoved lines receive a combination of input signals other than a predetermined combination, it may be accurately determined which of the differing signals is more likely to be the correct signal. To accomplish the elimination of the line receiving the incorrect signal, means are provided for effecting a flow of current exceeding a predetermined magnitude in the line receiving the incorrect signal. Its associated current responsive means may then be activated. With the effect of the incorrect signal removed, the threshold device will therefore provide an output signal having a high probability of being correct, in accordance with the one remaining correct input signal.

The above stated and other objects will become more clearly apparent after a study of the following specification when read in conjunction with the accompanying drawings, in which.

Figure 1:
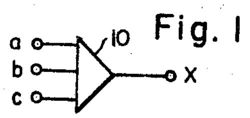
FIGURE 1 illustrates a symbol utilized herein to represent a logic device which may be used in a non-redundant computer system.

Referring now to FIG. 1, there is shown generally a logic element 10 having three inputs *a*, *b* and *c* which will produce an output X. The element shown is not intended to represent any specific logic device, but is merely representative of generic devices utilized in logic systems. If components within the element 10 fail, the output X will not be provided in the normal operation of the logic element, thus causing erroneous results.

Figure 2:
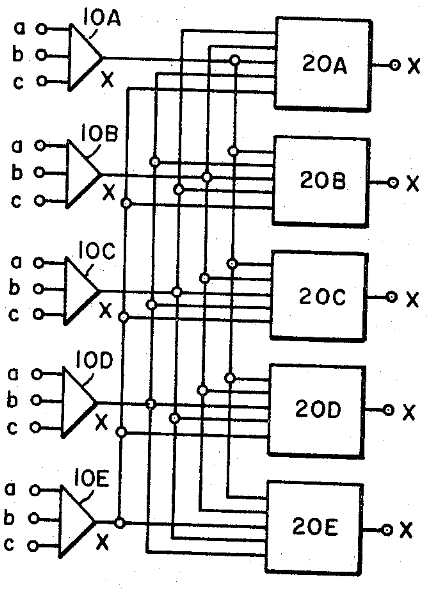
FIG. 2 illustrates a redundant version of the logic device of FIG. 1 and incorporates the present invention.

FIG. 2 shows the redundant version of FIG. 1 in which a redundancy in the order of 5 is utilized. Instead of one element 10 to produce an output X, there is provided five such elements 10A through 10E, with each receiving the inputs *a*, *b* and *c* and each operative to provide the output X. Each of the blocks labeled 20A through 20E may incorporate the present invention and it may be seen that each is responsive to the output signals provided by all of the logic elements 10A through 10E to thereby provide a unitary output X, and will continue to do so even after a predetermined number of the elements 10A through 10E revert to a failed condition.

Figure 3:
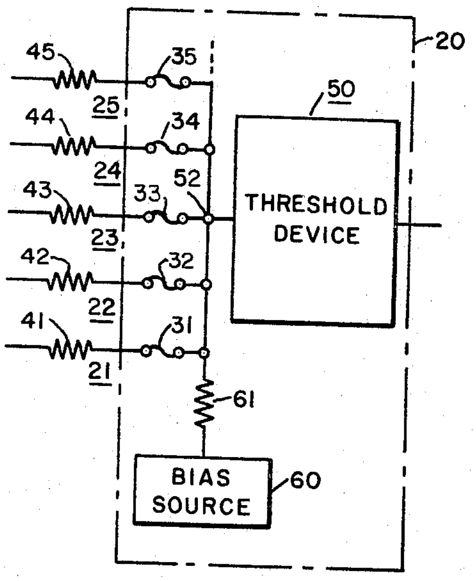
FIG. 3 illustrates a preferred embodiment of the present invention.

FIG. 3 shows in more detail a preferred embodiment of the present invention. The decision circuit 20 includes a plurality of input lines 21 to 25, however, it is to be understood that any reasonable number of input lines may be provided depending upon the order of redundancy of the previous circuit. Means are provided in each line to eliminate that particular line from the circuit should a non-agreeing signal occur on that line, which means takes the form of current responsive devices 31 to 35 and in its simplest embodiment may be a fuse or a circuit breaker. Each line 21 to 25 is shown to have a respective resistance 41 to 45 which may represent for example, the output impedance of a previous circuit, the resistance of the lines themselves, and any additional resistance or impedance which may be desired to be put in each line. The total impedance in each line is made small relative to the input impedance of threshold device 50. Each of the lines 21 to 25 is connected to a summation point 52 which in turn may be connected to a utilization means such as the threshold device 50 shown. The threshold device 50 has a relatively high impedance and functions to provide an output signal in accordance with its input voltage, the input voltage being dependent upon the number of lines providing correct input signals. Threshold devices are generally well known in the art such as exemplified by the common Schmidt trigger.

In operation, assume that each of the input lines 21 to 25 is receiving a correct input signal, that is, each one is receiving an identical signal, the totality of lines for example receiving all binary ONES, or all binary ZEROS. Since the input signals are identical there is little or no differential current flow between any of the input lines through the summation point 52. The threshold device 50 will then be providing an output signal in accordance with the correct input signals. In order to eliminate a line receiving an erroneous input signal when two lines remain unremoved, as will be hereinafter explained, there is provided biasing means 60 having an associative bias resistor 61 which is connected to the summation point 52 to thereby provide a predetermined current to the input lines. If a combination of signals other than a predetermined combination is presented to the input lines 21 to 25 a flow of current will occur in the erring line. By way of example consider a situation wherein the predetermined combination of preselected ONE or ZERO signals is such that the input lines should receive at any instance of time either all ZEROS or all ONES. Assume further that line 25 receives a binary ZERO while lines 21 to 24 receive binary ONES. In this instance, current from the latter lines will flow through line 25 including the current responsive device or fuse 35. The differential currents flowing in lines 21 to 24 are below the magnitude needed to activate the fuse in those lines, and line 25 receiving the totality of current from lines 21 to 24 has a flow of current therein exceeding the magnitude for activating the fuse 35 and if the response of fuse 35 is instantaneous, it will melt and cause an open circuiting of line 25 thus eliminating the erroneous signal from the decision circuit. If the response of fuse 35 is not instantaneous, it will cause the removal of line 25 in the circuit at some predetermined time after the occurrence of the erroneous signal, which time is dependent upon the rating of the fuse, and the number of times that the input signals on the remaining lines disagree with the input signal on the erring line in a given period of time.

In a given system, the input signals on lines 21 to 25 may be rapidly changing binary states in a given period of time. During this period of time, any input signal which disagrees with a correct input signal may eventually cause actuation of a current responsive device to remove the erring line. During this disagreement period, the threshold device 50 will continue to provide a correct output signal in accordance with the correct input signals since the voltage at summation point 52 which is utilized as the input to threshold device 50 will be continuously on the correct side of the threshold voltage of the threshold device 50 due to the preponderance of correct signals over erroneous signals. If after the removal of line 25 an incorrect signal is received by another line for example, line 24, the current responsive device 34 will be operative to remove the line 24 from the circuit in a manner similiar to the removal of line 25 such that the threshold device 50 will provide a proper output signal in accordance with the signals on the three remaining lines. If during the course of operation of the decision circuit in FIG. 3, all but two lines fail, and one of the two remaining unremoved lines receives an incorrect signal, biasing means 60 will be operative to remove the line receiving the incorrect signal and to this end reference should now be made to FIG. 4.

Figure 4:
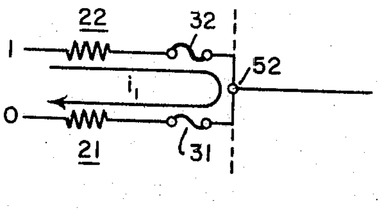
FIGS. 4, 5 and 6 are electrical schematic diagrams partly in block form, to aid in an understanding of the present invention.

In order to gain a better understanding of the operation of the present invention, FIG. 4 will demonstrate the situation arising wherein two remaining unremoved lines receive dissimilar input signals, and the consequences thereof in the absence of biasing means 60. For purposes of demonstration it is assumed hereinafter that a ONE input signal represents some positive voltage and a ZERO signal represents a ZERO or ground voltage. Further, in the demonstration of the operation of FIG. 4 let it be assumed that the ONE signal is most probably the correct input signal and the ZERO signal is the least probably correct signal. As was stated, this assumption may be made with an extremely high degree of probability of being correct. With line 21 receiving an incorrect ZERO signal, a current flow is initiated wherein the current $i_1$ flows through both lines 22 and 21 and it may be seen that the current responsive means 31 and 32 each carry the identical current. If the ratings of these current responsive means are chosen to be responsive to a current of at least $i_1$ magnitude one of the two current responsive means 31 or 32 will be activated to remove its associated line from the circuit. However, it cannot readily be determined which of the two current responsive devices will be activated. If the current responsive device 32 is activated it will effect a removal of the line 22 which in actuality is receiving the most probably correct input signal and therefore the incorrect ZERO input signal will govern the output of any threshold device which may be connected to summation point 52. To eliminate a situation wherein an incorrect output signal will be provided, reference may now be made to FIG. 5.

Figure 5:
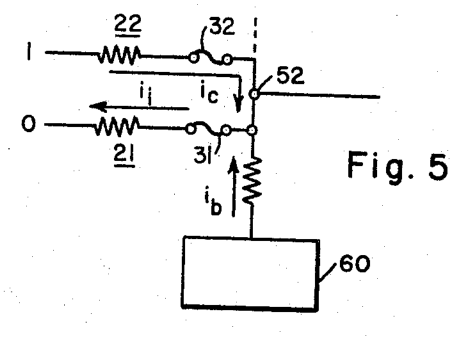

In FIG. 5 there is shown two remaining unremoved lines 21 and 22 connected together at summation point 52, in addition to biasing means 60 for providing a current of predetermined sign and magnitude. Assuming the same conditions as with respect to FIG. 4, the ONE input signal to line 22 of FIG. 5 is assumed to be the correct signal and the ZERO input signal to line 21 is the assumed incorrect signal. Biasing means 60 is chosen to provide a positive current $i_b$, into summation point 52. The positive current $i_b$ of FIG. 5 tends to decrease current flow in line 22 receiving a correct ONE signal and increase the current flow in line 21 receiving the incorrect ZERO signal. In FIG. 5 $i_c$ represents the net current flowing in the correct line 22 due to the bias current $i_b$ and $i_i$ represents the net current flowing in the incorrect line 21 as a result of the combination of $i_b$ and $i_c$. Whereas in FIG. 4 a current $i_1$ flows in both line 22 receiving the correct ONE signal and line 21 receiving the incorrect ZERO signal, the circuit of FIG. 5 with the inclusion of positive biasing means 60 results in a current $i_c$ in the correct line which is somewhat less than $i_1$ and a current $i_i$ in the incorrect line which is greater than $i_1$ thus the activation of current responsive means 31 may take place to remove the erring line from the circuit. If both of the two remaining unremoved lines 21 and 22 receive correct input signals at any instant of time, whether the input signals are ONES or ZEROS, the current supplied by the biasing means 60 will not be of sufficient magnitude to activate any of the current responsive means. The decision circuit of the present invention is equally applicable to circuitry wherein a ZERO signal is the most probably correct one and a ONE signal has the high probability of being in error and to this end reference should now be made to FIG. 6.

Figure 6:
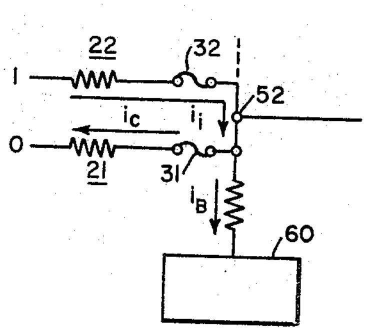

In FIG. 6 there is shown two remaining unremoved lines 21 and 22 with line 22 receiving an assumed incorrect ONE signal and line 21 receiving an assumed correct ZERO signal. As was stated, the two lines 21 and 22 are connected together at summation point 52 to which is also connected biasing means 60. In the present example, it is desired to remove line 22 receiving the incorrect ONE input signal and biasing means 60 is chosen to provide a negative current $i_b$. Whereas in FIG. 4 $i_1$ flows in line 21 and 22. The inclusion of negative bias means 60 in FIG. 6 adds to the current in line 22 so that a current $i_1$ flows and is greater than $i_1$ and opposes the current in line 21 so that a current $i_c$ flows and is somewhat less than $i_1$, thus the activation of current responsive means 32 may take place to remove the erring line from the circuit. It becomes apparent therefore that the biasing means 60 is chosen to effect a flow of current exceeding a predetermined magnitude in a preselected one of two remaining unremoved lines when they receive dissimilar signals. The magnitude and the polarity of the current supplied by the biasing means is chosen, and is dependent upon, which of the disagreeing input signals has the most probability of being erroneous. The magnitude is also governed by signal voltages, and circuit component values and ratings.

Accordingly, there has been provided an error canceling decision circuit having a plurality of input lines for receiving redundant input signals, and which circuit will remove a line receiving an incorrect signal, the decision circuit including biasing means which is operative when two remaining unremoved lines receive dissimilar signals, to effect the removal of the line receiving an assumed incorrect signal.

Although the present invention has been described with a certain degree of particularity, it should be understood that the present disclosure has been made by way of example and that modifications and variations of the present invention are made possible in the light of the above teaching.

What is claimed is:

1. An error canceling decision circuit comprising:
two input lines for receiving a predetermined combination of preselected signals;
said lines connected together at a summation point;
the occurrence of signals other than said predetermined combination causing a flow of current from one said line to the other said line; and
bias means connected to said summation point for increasing said current in one said line and decreasing said current in the other said line.

2. A decision circuit for use in redundant logical systems comprising:
a plurality of input lines for receiving a predetermined combination of input signals;
current responsive means associated with each said input line for removing said line from said circuit in response to a predetermined flow of current caused by a combination other than said predetermined combination;
biasing means for supplying a predetermined current to two remaining unremoved lines receiving dissimilar signals with one of said dissimilar signals having a high probability of being in error, to activate the current responsive means in the line receiving said probably erroneous signal.

3. An error canceling decision circuit comprising:
two input lines for receiving a predetermined combination of preselected signals;
current responsive means for each said line for removing a line from said circuit in response to a current exceeding a predetermined magnitude; and
means for effecting a flow of current exceeding said predetermined magnitude in a preselected one of said lines upon the occurrence of signals other than said predetermined combination.

4. A decision circuit for use in redundant logical systems comprising:
a plurality of input lines for receiving redundant input signals;
said input lines each including a current responsive device for removing a line from said circuit in response to a first predetermined flow of current caused by an incorrect input signal;
each said input line being connected together at a summation point;
biasing means operatively connected to said summation point for supplying a second predetermined current to said input lines;
said biasing means operative to supply said second predetermined current to two remaining unremoved lines receiving a correct and incorrect input signal to activate the current responsive means in the line receiving said incorrect input signal.

5. A decision circuit for use in redundant logical systems comprising:
a plurality of input lines for receiving a plurality of input signals;
current responsive means associated with each said input line for removing said line from said circuit in response to a predetermined flow of current caused by an incorrect input signal;
biasing means for supplying a predetermined current to two remaining unremoved lines receiving a correct and incorrect signal, to activate the current responsive means in the line receiving said incorrect signal; and
threshold means connected to said input lines to provide an output signal in response to said correct input signals.

6. An error canceling decision circuit comprising:
a plurality of input lines for receiving redundant input signals;
a summation point connecting all said input lines together;
current responsive means for each said input line responsive to a current exceeding a predetermined magnitude for removing its associated input line, said current being caused by an incorrect input signal and having said predetermined magnitude when more than two said lines remain unremoved;
means connected to said summation point for supplying a predetermined current to a line receiving an incorrect input signal when only two said input lines remain unremoved.

References Cited

UNITED STATES PATENTS 3,119,980 1/1964 Schreiner -------- 340—146.1 X

MALCOLM A. MORRISON, *Primary Examiner.*

M. J. SPIVAK, *Assistant Examiner.*